United States Patent
Yamanaka et al.

(10) Patent No.: US 7,454,912 B2
(45) Date of Patent: Nov. 25, 2008

(54) DEVICE FOR UTILIZING WASTE HEAT FROM HEAT ENGINE

(75) Inventors: Takashi Yamanaka, Kariya (JP); Atsushi Inaba, Kariya (JP); Shinichi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 338 days.

(21) Appl. No.: 11/316,169

(22) Filed: Dec. 22, 2005

(65) Prior Publication Data

US 2006/0225421 A1    Oct. 12, 2006

(30) Foreign Application Priority Data

Dec. 22, 2004    (JP)    ............................. 2004-372255

(51) Int. Cl.
*F01K 23/10*    (2006.01)
(52) U.S. Cl. .......................................... 60/618; 60/660
(58) Field of Classification Search .................... 60/614, 60/616, 618, 660
See application file for complete search history.

(56) References Cited

U.S. PATENT DOCUMENTS

| | | | | |
|---|---|---|---|---|
| 6,928,820 | B2 * | 8/2005 | Inaba et al. | .................... 60/618 |
| 6,935,129 | B2 * | 8/2005 | Sasaki et al. | ................ 62/238.4 |
| 7,007,473 | B2 * | 3/2006 | Nagatani et al. | ............... 60/616 |
| 7,181,919 | B2 * | 2/2007 | Uno et al. | ...................... 62/157 |
| 2003/0213246 | A1 * | 11/2003 | Coll et al. | ...................... 60/653 |
| 2005/0109031 | A1 | 5/2005 | Inaba et al. | |
| 2005/0217288 | A1 * | 10/2005 | Uno et al. | ...................... 62/157 |

FOREIGN PATENT DOCUMENTS

JP    63-96449    4/1988

* cited by examiner

*Primary Examiner*—Hoang M Nguyen
(74) *Attorney, Agent, or Firm*—Harness, Dickey & Pierce, PLC

(57) ABSTRACT

A device for utilizing waste heat from a heat engine comprises a Rankine cycle including a pump, a heating device, an expansion device, and a condenser device, and a controller for controlling an operation of the Rankine cycle. The controller calculates an optimum heat collection amount (Qho) as a heat value to be collected from waste heat of the engine, wherein the heat collection amount (Qho) is calculated as an optimum amount in relation to a potential maximum heat radiation amount (Qco) to be radiated at the condenser device. The controller calculates an optimum flow amount (G) of refrigerant corresponding to the optimum heat collection amount (Qho), so that a maximum driving power (L) is generated at the expansion device.

14 Claims, 8 Drawing Sheets

DEVICE FOR UTILIZING WASTE HEAT FROM HEAT ENGINE

CROSS REFERENCE TO RELATED APPLICATION

This application is based on and incorporates herein by reference Japanese patent application 2004-372255 filed on Dec. 22, 2004.

FIELD OF THE INVENTION

The present invention relates to a device having a Rankine cycle for collecting heat energy from a heat engine, and in particular the present invention is suitable to be applied for a vehicle having an internal combustion engine as the heat engine and having a refrigerating cycle (an air conditioning system).

BACKGROUND OF THE INVENTION

In a conventional device for utilizing waste heat disclosed, for example, in Japanese Patent Publication No. S63-96449, a component (a condenser) of a refrigerating cycle is commonly used to form a Rankine cycle. The waste heat is collected from an automotive engine (an internal combustion engine) as a driving force by an expansion device, which is also used as a compressor device. The collected driving force is applied (retuned) to the engine.

However, regarding an operation for the Rankine cycle of the device for utilizing the waste heat, it is only disclosed in the publication that a pressure applying pump for the Rankine cycle is activated by switching refrigerant paths after deactivating the refrigerating cycle. Namely, the above publication includes no description for a condition, under which the device for utilizing the waste heat switches between the refrigerating cycle and the Rankine cycle. In addition, the publication has no description how the Rankine cycle is controlled in order to efficiently collect the waste heat. Therefore, it is difficult to put, based on the publication, the device for utilizing the waste heat into a practical use.

SUMMARY OF THE INVENTION

The present invention is made in view of the above problems. It is an object of the present invention to provide a device for utilizing waste heat from a heat engine to efficiently collect the waste heat.

According to a feature of the present invention, a waste heat utilization device for utilizing waste heat from a heat engine comprises a Rankine cycle, which includes; a heating device for heating, by means of the waste heat from the heat engine, working fluid circulated by a pump to transform the working fluid to heated vapor; an expansion device for generating a driving power (L) by means of expansion of the heated vapor from the heating device; and a condenser device for condensing the heated vapor from the expansion device to transform the heated vapor to condensed fluid and sending the condensed fluid to the pump. The waste heat utilization device further includes a controller for controlling an operation of the Rankine cycle.

When a temperature of the waste heat from the heat engine is higher than a predetermined temperature, the controller calculates an optimum heat collection amount (Qho) which is to be collected from the heat engine, and which is correlated with a heat radiation amount (Qc) to be radiated at the condenser device in an operating condition of the waste heat utilization device at a time that such a calculation is made; and the controller controls a flow amount (G) of the working fluid to collect the heat collection amount (Oho), so that the driving power (L), which is defined by an actual heat collection amount and an actual heat radiation amount, is efficiently generated at the expansion device.

According to the above feature of the present invention, the Rankine cycle can be operated without depriving heat energy exceedingly from the engine. And an optimum driving power (L) can be regenerated at the expansion device, while keeping a heat balance between the condenser device and the heating device. As a result, regeneration efficiency of the Rankine cycle can be improved.

According to another feature of the present invention, a rotational speed of the expansion device is controlled by the controller in such a manner that a pressure (Ph) of the working fluid at the heating device equals to a target pressure (Pho), which varies depending on the temperature of the waste heat.

According to the above feature of the invention, the driving power (L) can be stably generated at the expansion device, depending on the waste heat temperature, even when the waste heat temperature is changed.

According to a further feature of the invention, the heat engine is mounted in a vehicle, and vehicle wind is supplied to the condenser device when the vehicle runs. In such an arrangement, the optimum heat collection amount (Qho) is calculated based on parameters of an operating condition, such as a vehicle speed and an outside temperature of the vehicle.

According to a still further feature of the invention, a rotational speed of the engine can be used as a parameter of the operating condition, instead of the vehicle speed.

According to a still further feature of the invention, the optimum heat collection amount (Qho) can be alternatively calculated based on a refrigerant pressure (Pc) at a side of the condenser device, wherein the refrigerant pressure (Pc) is treated as a parameter of the operating condition for the condenser device.

According to a still further feature of the invention, the flow amount (G) of the refrigerant can be controlled by changing a rotational speed of the refrigerant pump.

According to a still further feature of the invention, a discharge amount variable pump is used for the refrigerant pump, wherein the flow amount (G) of the refrigerant can be controlled by changing a discharge amount for each rotation.

According to a still further feature of the invention, a bypass passage may be provided to bypass the refrigerant pump, wherein an opening degree of the bypass passage can be adjustable. The flow amount (G) of the refrigerant can be alternatively controlled by adjusting the opening degree of the bypass passage.

According to a further feature of the invention, the waste heat utilization device is suitable for a vehicle having an internal combustion engine.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
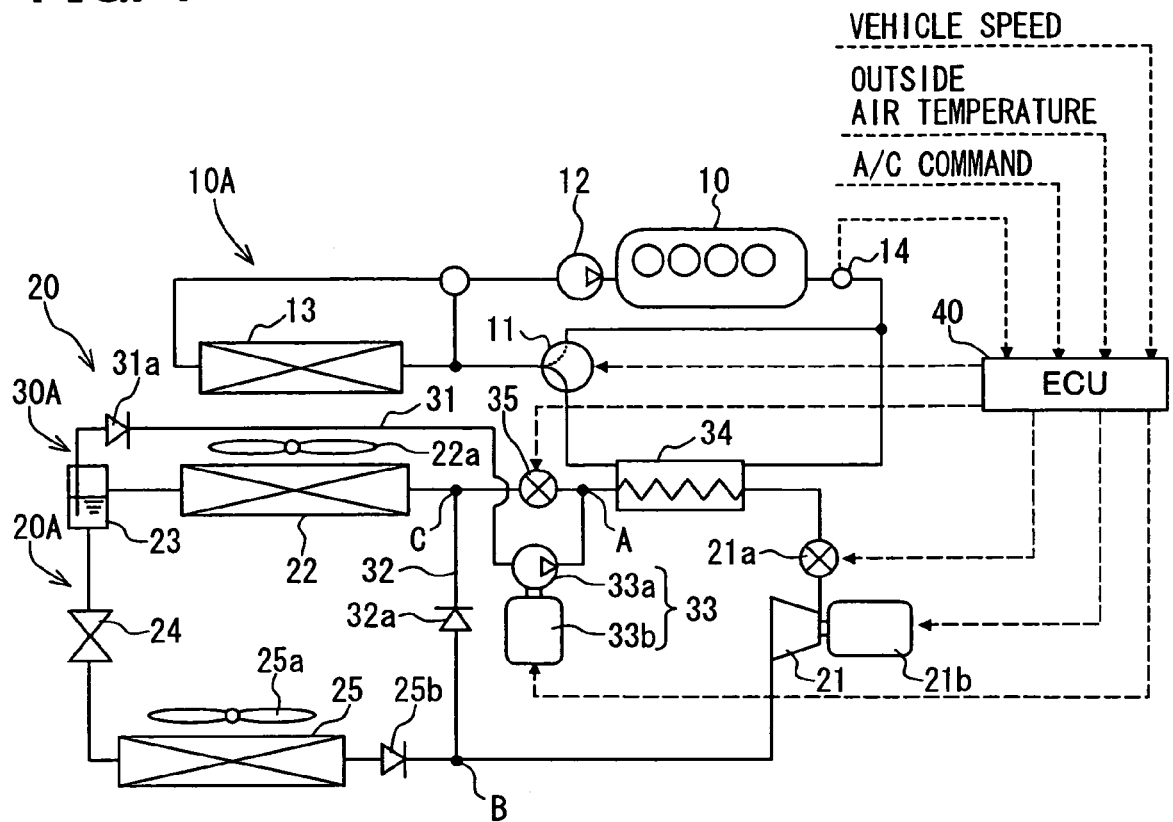
FIG. 1 is a schematic view showing a system structure of a device for utilizing waste heat from a heat engine according to a first embodiment of the present invention.
Figure 3:
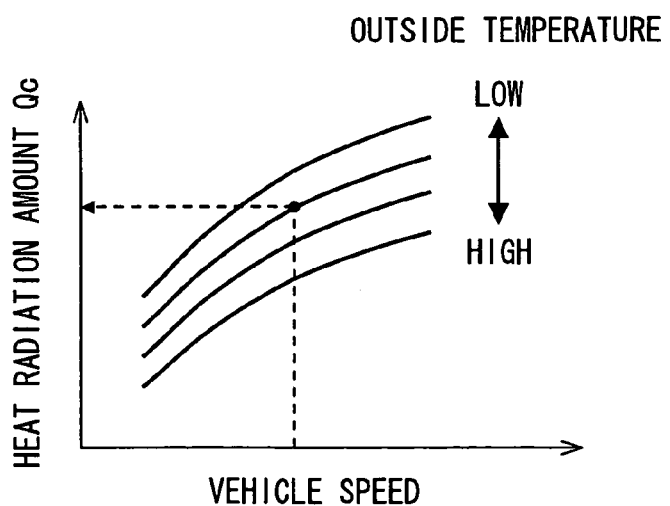
FIG. 3 is a map showing a relation between a potential maximum heat radiation amount and a vehicle speed, in a case that the device for utilizing the waste heat of the invention is installed in a vehicle.

A first embodiment of the present invention is a waste heat utilization device 20 for utilizing waste heat from a heat engine. The waste heat utilization device 20 is applied to a vehicle having an internal combustion engine 10, which corresponds to the heat engine, as a source of a driving force for a movement of the vehicle. The waste heat utilization device 20 collects energy from the waste heat generated by the engine 10 and has a Rankine cycle 30A and a controller 40. The Rankine cycle 30A commonly uses some devices constituting a refrigerating cycle 20A. Hereafter, a system structure of the waste heat utilization device 20 is described with reference to FIG. 1.

The refrigerating cycle 20A utilizes low temperature heat and high temperature heat for air conditioning by transferring heat from a low temperature side to a high temperature side, and has an expansion-compressor device 21, a condenser device 22, a gas-liquid separator 23, a depressurizing device 24, and an evaporator 25, which are connected circularly.

The expansion-compressor device 21, which corresponds to an expansion device in the present invention, is a fluid machine which is operated both in a compression mode and in an expansion mode. In the compression mode, the expansion-compressor device 21 functions as a compression device by applying a pressure to gas phase refrigerant and discharging the refrigerant. In the expansion mode, the expansion-compressor device 21 functions as an expansion device by converting a fluid pressure of expanding refrigerant vaporized by the high temperature heat to kinetic energy and outputting mechanical energy. The expansion-compressor device 21 has the same structure as a well-known scroll type compression machine. A valve device 21a is installed at a discharge side of the expansion-compressor device 21, to which the refrigerant flows from the expansion-compressor device 21 in the compression mode.

When the expansion-compressor device 21 is in the compression mode, the valve device 21a allows the compressed refrigerant to flow out from the expansion-compressor device 21 and functions as a check valve by preventing the compressed refrigerant from flowing back into the expansion-compressor device 21. When the expansion-compressor device 21 is in the expansion mode, the valve device 21a functions as an ON-OFF valve which opens a refrigerant path to allow the vaporized refrigerant from a heating device 34 (described later) to flow into the expansion-compressor device 21. An operation of switching the valve device 21a between the check valve and the ON-OFF valve is controlled by the controller 40, which is described later in detail.

An electric power generator-electric motor 21b is connected with the expansion-compressor device 21. The electric power generator-electric motor 21b includes a stator (not shown) and a rotor (not shown) and is controlled by the controller 40. The electric power generator-electric motor 21b functions as an electric motor by rotating the rotor and drives the expansion-compressor device 21 to operate the same as the compression device, when the stator is supplied with an electric power from a battery (not shown). The electric power generator-electric motor 21b also functions as an electric power generator by generating an electric power, when a torque for rotating the rotor is applied to the electric power generator-electric motor 21b by a driving power generated in the expansion mode of the expansion-compressor device 21. The controller 40 stores the generated electric power into the battery. A rotational speed of the expansion-compressor device 21 in the expansion mode can be adjusted by an electric current signal (or an electric voltage signal) to be supplied from the controller 40 to the electric power generator-electric motor 21b.

The condenser device 22 is a heat exchanger located at the discharge side of the expansion-compressor device 21 in the compression mode. The condenser device 22 exchanges heat between the outside air and the refrigerant compressed to high temperature and high pressure (namely, radiates the heat of the refrigerant to the outside air) to cool down the refrigerant, and transforms the refrigerant to condensed liquid. The condenser device 22 is provided at a downstream side of a grill and a bumper of the vehicle and is supplied with wind (hereafter vehicle wind) which is produced by a movement of the vehicle and functions as the outside air for the heat exchange. When the engine 10 is idling or the vehicle is going up on a slope slowly, cooling wind is supplied from a cooling fan 22a because it is unlikely in this case to receive the vehicle wind produced by the movement of the vehicle.

The gas-liquid separator 23 is a receiver which separates the refrigerant condensed at the condenser device 22 into liquid phase refrigerant and gas phase refrigerant, and discharges the liquid phase refrigerant. The depressurizing device 24 depressurizes and expands the liquid phase refrigerant flowing out from the gas-liquid separator 23. In this embodiment, the depressurizing device 24 is a temperature dependent type expansion valve which depressurizes the refrigerant isenthalpically and controls a degree of its opening so that a degree of heating of the refrigerant flowing into the expansion-compressor device 21 in the compression mode is controlled at a predetermined degree.

The evaporator 25 is a heat exchanger for performing a heat absorbing operation by evaporating the refrigerant depressurized by the depressurizing device 24, to cool down air for air conditioning from a blower 25a. A check valve 25b is provided at an outlet side of the evaporator 25 to which the refrigerant flows from the evaporator 25, for allowing the refrigerant to flow only from the evaporator 25 to the expansion-compressor device 21.

The Rankine cycle 30A collects, from the waste heat generated by the engine 10, energy for the driving power to be generated at the expansion-compressor device 21 in its expansion mode. The Rankine cycle 30A commonly uses the condenser device 22 and the gas-liquid separator 23 of the refrigerating cycle 20A, and includes a first bypass passage 31 and a second bypass passage 32. The first bypass passage 31 is connected at its one end with the gas-liquid separator 23 and at the other end with a point A between the expansion-compressor device 21 and the condenser device 22, bypassing the condenser device 22. The second bypass passage 32 is connected at its one end with a point B between the expansion-compressor device 21 and the check valve 25b and at the other end with a point C between the condenser device 22 and the point A.

At the first bypass passage 31, a pump portion 33a of a refrigerant pump 33 and a check valve 31a are provided, wherein the check valve 31a allows the refrigerant to flow only from the gas-liquid separator 23 to the pump portion 33a. A motor portion 33b is connected with the pump portion 33a, which is driven by the motor portion 33b. The pump portion 33a is a fixed-amount type pump, which pumps out a predetermined amount of the refrigerant for each rotation. The pump portion 33a and the motor portion 33b constitute the refrigerant pump 33, which is controlled by the controller 40.

The heating device 34 is provided between the point A and the expansion-compressor device 21. The heating device 34 is a heat exchanger for heating up, by heat-exchange between the refrigerant supplied by the refrigerant pump 33 and engine cooling water (hot water) of an engine cooling circuit 10A (hot water circuit) for the engine 10, the refrigerant which corresponds to working fluid in the present invention. A three way valve 11 is provided in the engine cooling circuit 10A for switching its valve positions from a water circulation mode in which the engine cooling water is circulated through the heating device 34 to a water non-circulation mode in which the engine cooling water is not circulated through the heating device 34, and vice versa. A switching operation of the three way valve 11 is controlled by the controller 40.

A water pump 12, which is for example a mechanical pump driven by the engine 10 or an electric pump driven by an electric motor, is provided in the engine cooling circuit 10A for circulating the engine cooling water. A radiator 13 is a heat exchanger for heat-exchanging the engine cooling water with the outside air for cooling down the engine cooling water.

A water temperature sensor 14 is provided at an exit side of the engine 10 from which the engine cooling water flows out, detects a temperature of the engine cooling water, and outputs to the controller 40 a cooling water temperature signal indicating the detected temperature.

At the second bypass passage 32, a check valve 32a is provided for allowing the refrigerant to flow only from the expansion-compressor device 21 to an entrance side of the condenser device 22, through which the refrigerant flows into the condenser device 22. An ON-OFF valve 35 is provided between the point A and the point C. The ON-OFF valve 35 is an electromagnetic valve for opening and closing a refrigerant path between the point A and the point C, and is controlled by the controller 40.

The Rankine cycle 30A is constituted by the gas-liquid separator 23, the first bypass passage 31, the refrigerant pump 33, the heating device 34, the expansion-compressor device 21, the second bypass passage 32, the condenser device 22, and so on.

The controller (control means) 40 receives an A/C (Air Conditioning) command signal generated based on a preset temperature set by a passenger in the vehicle and an environmental temperature, an outside air temperature signal outputted by an outside air temperature sensor (not shown), a vehicle speed signal outputted by a vehicle speed sensor (not shown), and the cooling water temperature signal from the water temperature sensor 14. Based on the received signals, the controller 40 executes a control of operations of the three way valve 11, the valve device 21a, the electric power generator-electric motor 21b, the refrigerant pump 33, and the ON-OFF valve 35. The controller stores in its memory device a heat collection amount map (FIG. 4) and a rotational speed map (FIG. 6) for the refrigerant pump 33, for the purpose of performing a control operation of the present invention, which will be described below in detail.

Hereafter, an operation of the waste heat utilization device 20 (or an operation of the controller 40) is described with reference to FIGS. 2-6.

Figure 2:
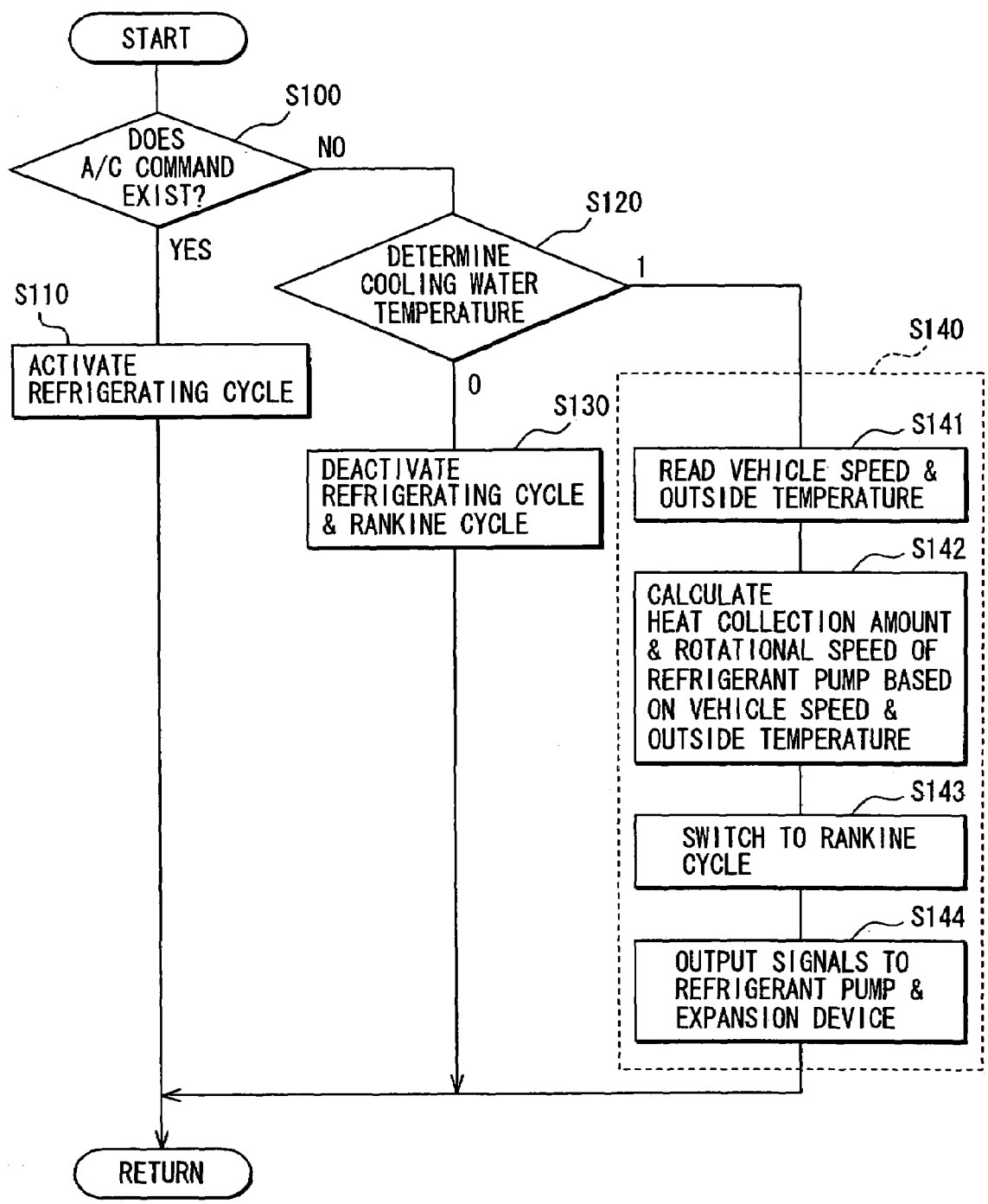
FIG. 2 is a flowchart showing a control process for an operation of a Rankine cycle according to the first embodiment.

FIG. 2 is a flow chart for controlling the refrigerating cycle 20A and the Rankine cycle 30A. When an A/C command by the vehicle passenger is detected at a step S100, the controller 40 activates at a step S110 the refrigerating cycle 20A for the air conditioning operation (cooling air), wherein the Rankine cycle 30A is not activated. Namely, the controller 40 opens the ON-OFF valve 35 while keeping the refrigerant pump 33 non-operated, and switches a valve position of the three way valve 11 to prevent the engine cooling water from circulating through the heating device 34. In addition, the controller 40 switches a valve position of the valve device 21a to operate the same as the check valve. Furthermore, the controller 40 operates the electric power generator-electric motor 21b as the electric motor, to operate the expansion-compressor device 21 in the compression mode for sucking in and compressing the refrigerant, to operate the refrigerating cycle 20A.

In the above operation of the refrigerating cycle 20A, the refrigerant compressed and discharged by the expansion-compressor device 21 is circulated through the valve device 21a, the heating device 34, the ON-OFF valve 35, the condenser device 22, the gas-liquid separator 23, the depressurizing device 24, the evaporator 25, the check valve 25b, and the expansion-compressor device 21 in this order, that is, circulated through the refrigerating cycle 20A. The refrigerant vaporized in the evaporator 25 absorbs heat from the air for the air conditioning from the blower 25a to cool down the air for the air conditioning. Since the engine cooling water does not flow through the heating device 34, the refrigerant is not heated in the heating device 34. Therefore, the heating device 34 functions as a normal refrigerant path.

In the case that the controller 40 determines at the step S100 that no A/C command signal from the vehicle passenger exists, the controller 40 performs at a step S120 a determination whether the cooling water temperature (waste heat temperature in the present invention) detected by the water temperature sensor 14 is higher than a predetermined temperature (e.g. 80 degrees C.).

In the case that the determination at the step S120 is negative ("0" at S120), that is, the waste heat from the engine 10 is not sufficient, the controller 40 makes at a step S130 the refrigerating cycle 20A and the Rankine cycle 30A inactive. In other words, the controller 40 stops the electric power generator-electric motor 21b and the refrigerant pump 33.

In the case that the determination at the step S120 is affirmative ("1" at S120), that is, the waste heat from the engine 10 is sufficient, the controller 40 activates the Rankine cycle 30A at a step 140 (steps S141 to S144).

The controller 40 reads at the step S141 the vehicle speed and the outside air temperature, and calculates (determines) at the step S142 an optimum heat collection amount Qho at the heating device 34. The controller 40 further calculates (determines) an optimum flow amount Go of the refrigerant as well as an optimum rotational speed of the refrigerant pump 33 corresponding to the optimum flow amount Go. The optimum heat collection amount Qho and the optimum flow amount Go are determined according to the heat collection amount map shown in FIG. 4. The optimum rotational speed of the refrigerant pump 33 corresponding to the optimum flow amount Go is subsequently determined according to the rotational speed map in FIG. 6.

In the condenser device 22, the amount of the vehicle wind produced by the movement of the vehicle increases as the vehicle speed increases, and a temperature difference between the refrigerant and the wind becomes larger as an outside temperature (i.e. a temperature of the wind) becomes lower. Therefore, heat radiation capability of the condenser device 22 becomes larger as the vehicle speed increases and/or the outside temperature becomes lower. The heat radiation capability of the condenser device 22 can be represented by, for example, a potential maximum heat radiation amount Qco, which is achieved by the condenser device 22 in a given operating condition. This characteristic of the heat radiation capability is shown in a heat radiation amount map of FIG. 3, which shows a relation between the potential maximum heat radiation amount Qco and parameters of the operating condition regarding the vehicle running condition, such as the vehicle speed and the outside air temperature.

Figure 5:
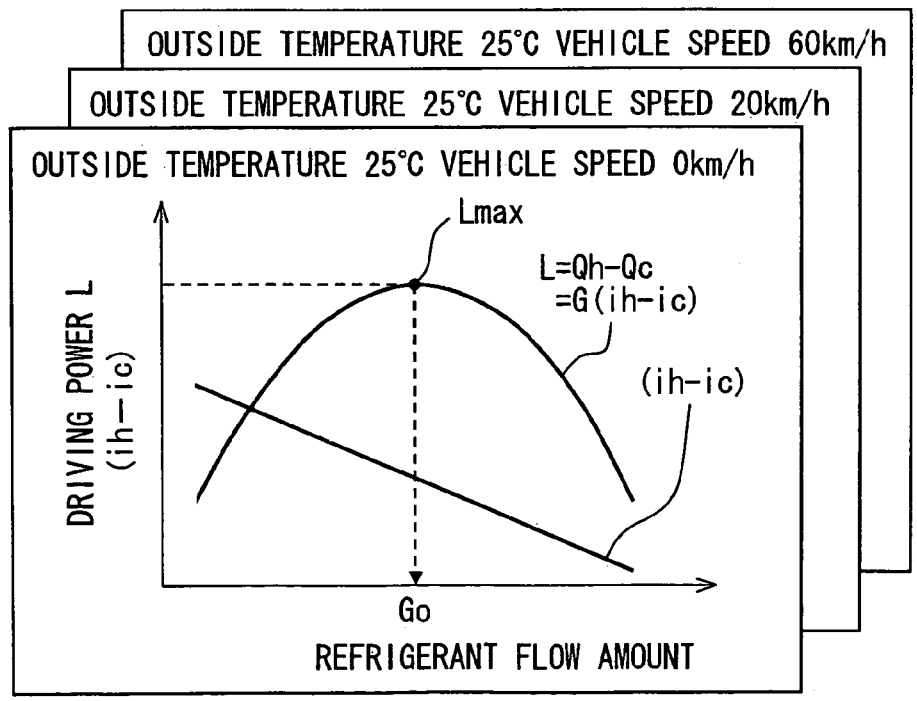
FIG. 5 is a map showing a relation between a driving power to be generated at an expansion device and the flow amount of refrigerant.

The driving power L generated by the expansion-compressor device 21 in the expansion mode is calculated as a function of a difference value of (Qh−Qc), wherein Qh is the heat collection amount and Qc is the heat radiation amount. The heat collection amount Qh is energy which the refrigerant collects from the engine cooling water at the heating device 34 per unit time, and the heat collection amount Qh is calculated as a product of an enthalpy difference ih per unit amount at the heating device 34 and a flow amount G of the refrigerant. The heat radiation amount Qc is energy which the refrigerant radiates at the condenser device 22 per unit time, and the heat radiation amount Qc is calculated as a product of an enthalpy difference ic per unit amount at the condenser device 22 and the flow amount G of the refrigerant. Therefore, the driving power L can be represented, as shown in FIG. 5, by a formula:

$$L = G \times ih - G \times ic = G \times (ih - ic).$$

The quantity (ih−ic) is an enthalpy difference per unit amount between an entrance and an exit of the expansion-compressor device 21, wherein the entrance is an end of the expansion-compressor device 21 through which the refrigerant flows into the expansion-compressor device 21 in the expansion mode and the exit is the other end of the expansion-compressor device 21 through which the refrigerant flows out of the expansion-compressor device 21 in the expansion mode.

Therefore, in the case that the heat radiation amount Qc is smaller compared to the heat radiation capability of the condenser device 22, a pressure of the refrigerant at the exit of the expansion-compressor device 21 decreases. Then, a pressure difference of the refrigerant between the exit and the entrance of the expansion-compressor device 21 becomes larger, and the quantity (ih−ic) becomes larger. On the other hand, in the case that the flow amount G of the refrigerant increases, the heat radiation amount Qc and a pressure at the condenser device 22 also increase. In this case, the pressure of the refrigerant at the exit of the expansion-compressor device 21 becomes higher and therefore the quantity (ih−ic) becomes smaller, as shown by a declining line in FIG. 5. As a result, as shown in FIG. 5, in a given operating condition specified by the outside temperature, the vehicle speed and the cooling water temperature, the driving power L (i.e. the product of the flow amount G and the enthalpy difference value (ih−ic)) has a local maximum value Lmax as a function of the flow amount G. In other words, a characteristic curve of the driving power L with respect to the flow amount G is represented by an exponential curve having a convex at its upper side.

In addition, in the case that the cooling water temperature is high, the pressure difference between the entrance and the exit of the expansion-compressor device 21 becomes larger, since the pressure of the refrigerant at the entrance is increased. Therefore, in this case, the enthalpy difference value (ih−ic) increases, and the driving power L is thereby increased.

Figure 4:
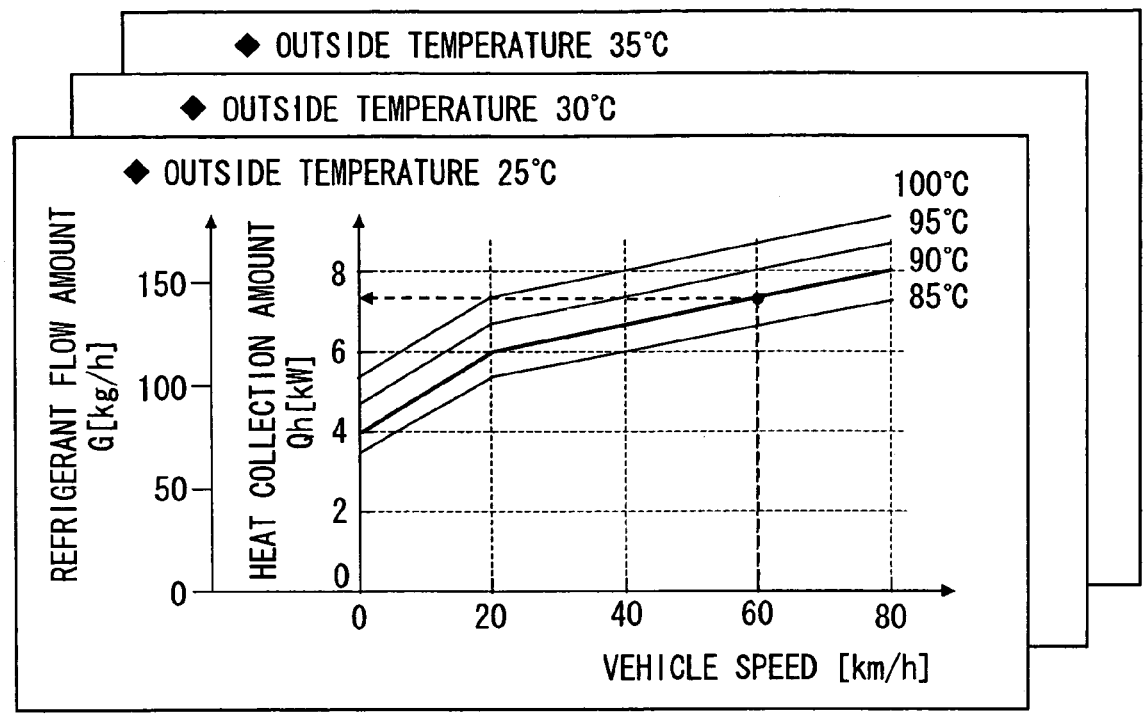
FIG. 4 is a map for use in calculating a heat collection amount and a flow amount of refrigerant.

The heat collection amount map of FIG. 4 is prepared based on the characteristics described above, wherein the heat collection amount as well as the flow amount of the refrigerant are correlated to the parameters of the operating condition, such as the vehicle speed, the outside air temperature, and the cooling water temperature.

As already explained, the heat radiation amount (the heat radiation capability) at the condenser device 22 is increased, as the vehicle speed becomes higher and/or the outside air temperature becomes lower. Therefore, the heat collection amount Qh can be increased in proportion to the increase of the heat radiation amount Oc. This characteristic (i.e. the relation between the heat collection amount Qh and the heat radiation amount Qc) is incorporated into the preparation of the heat collection amount map of FIG. 4.

Therefore, the optimum heat collection amount Qho is determined from this heat collection amount map, by selecting a set of parameters including the vehicle speed, the outside temperature, and the cooling water temperature. Furthermore, the optimum flow amount Go is likewise determined from this heat collection amount map, by selecting the above set of parameters including the vehicle speed, the outside temperature, and the cooling water temperature. In other words, the optimum flow amount Go is determined corresponding to the optimum heat collection amount Qho.

As above, the controller 40 calculates (determines), at the step S142, the optimum heat collection amount Qho in accordance with the cooling water temperature detected at the step S120, as well as the vehicle speed and the outside air temperature detected at the step S141. The controller 40 further calculates (determines) the optimum flow amount Go of the refrigerant and the rotational speed of the refrigerant pump 33 corresponding to the optimum heat collection amount Qho.

For example, in the case that the cooling water temperature is 90 degrees C., the vehicle speed is 60 km/h, and the outside air temperature is 25 degrees C., the optimum heat collection amount Qho is determined as 7.4 kw, as shown by a dashed line in FIG. 4, and the optimum flow amount Go is determined as 142 kg/h.

Figure 6:
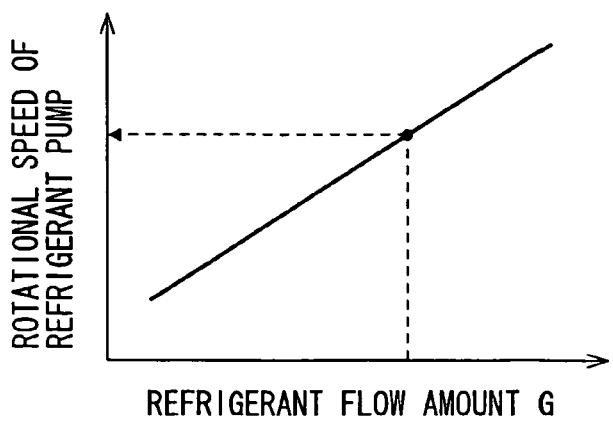
FIG. 6 is a map showing a relation between a rotational speed of a refrigerant pump and the flow amount of the refrigerant.

As shown in FIG. 6, which shows a relation between the rotational speed of the refrigerant pump 33 and the flow amount G of refrigerant, the flow amount G is proportional to the rotational speed, because the refrigerant pump 33 is a fixed-amount type pump. The controller 40 determines, by means of the relation shown in FIG. 6, the rotational speed of the refrigerant pump 33 according to the optimum follow amount Go determined as described above.

Subsequently, the controller 40 switches the operation of the waste heat utilization device to the Rankine cycle 30A, at the step S143. Namely, the controller 40 switches the valve position of the three way valve 11 to circulate the engine cooling water through the heating device 34. In addition, the controller 40 closes the ON-OFF valve 35 and makes the valve device 21a open the refrigerant path to operate the expansion-compressor device 21 in the expansion mode.

At the step S144, the controller 40 controls the rotational speed of the refrigerant pump 33 determined at the step S142, and operates the electric power generator-electric motor 21b as the electric power generator. In this operation, the controller 40 adjusts the rotational speed of the electric power generator-electric motor 21b (i.e. the rotational speed of the expansion-compressor device 21) by varying the electric current signal (or the electric voltage signal) to the electric power generator-electric motor 21b, so that a pressure Ph of the refrigerant at the heating device 34 equals to a target pressure Pho which is determined based on the cooling water temperature. More specifically, the controller 40 increases the rotational speed of the electric power generator-electric motor 21b when the pressure Ph is higher than the target pressure Pho, and decreases the rotational speed thereof when the pressure Ph is lower than the target pressure Pho.

The refrigerant pumped out from the refrigerant pump 33 is heated at the heating device 34 by an amount corresponding to the heat collection amount Qh, and transformed into the vaporized refrigerant. The refrigerant passes through the valve device 21a, and expands at the expansion-compressor device 21 in the expansion mode. The expansion-compressor device 21 thereby generates the driving power L, which drives the electric power generator-electric motor 21b to generate the electric power. The controller 40 controls that the generated electric power is charged into the battery.

The refrigerant flowing out from the expansion-compressor device 21 is circulated through the second bypass passage 32, the check valve 32a, the condenser device 22, the gas-liquid separator 23, the first bypass passage 31, the check valve 31a, and the refrigerant pump 33 in this order, that is, circulated through the Rankine cycle 30A.

As described above, the controller 40 of the embodiment determines based on the cooling water temperature whether or not the Rankine cycle 30A can be activated (at the step S120). Therefore, the controller 40 can operate the Rankine cycle 30A without depriving heat energy exceedingly from the engine 10.

In addition, before activating the Rankine cycle 30A, the controller 40 calculates (at the step S140) the optimum heat collection amount Qho at the heating device 34, in such a manner that the heat collection amount Qho is calculated as an optimum value in relation to the maximum heat radiation amount Qco. The controller 40 further determines the flow amount G of the refrigerant, with which the driving power L to be generated at the expansion-compressor device 21 and to be defined by the heat collection amount Qh and the heat radiation amount Qc can be maximized. As a consequence, it is possible to regenerate the optimum driving power L at the expansion-compressor device 21 by balancing the heat between the condenser device side and the heating device side. Thus, it is possible to improve regeneration efficiency of the Rankine cycle 30A.

Figure 7:
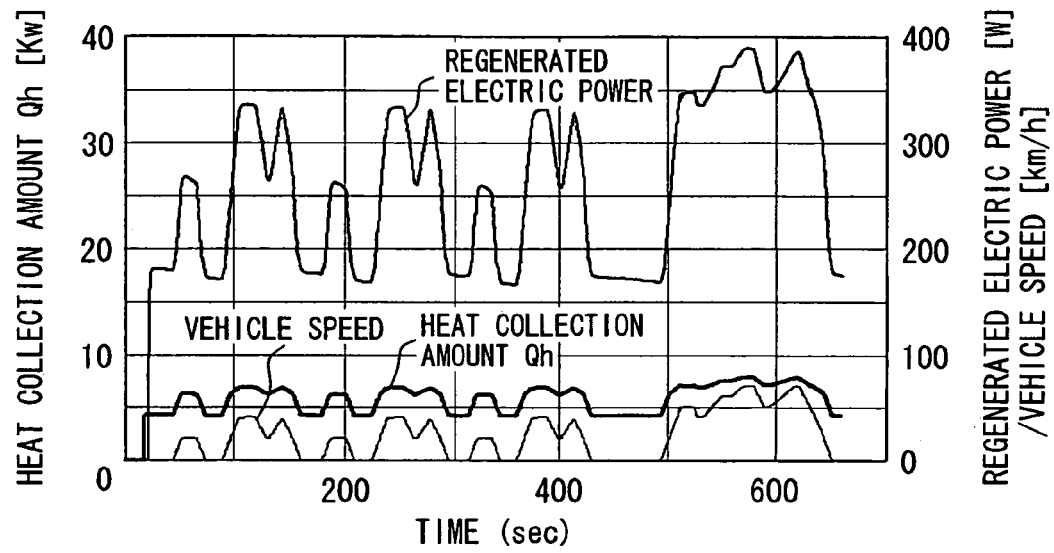
FIG. 7 is a timing chart showing a relation between the heat collection amount and a regenerated electric power according to the first embodiment.

In addition, since the controller 40 adjusts the rotational speed of the expansion-compressor device 21, so that the pressure Ph of the refrigerant at the heating device 34 equals to the target pressure Pho which depends on the cooling water temperature, it is possible to stably obtain the driving power L at the expansion-compressor device 21, even when the cooling water temperature is changed FIG. 7 is a timing chart showing a relation among the vehicle speed, the heat collection amount Qh, and the regenerated electric power of the above embodiment (according to a paper simulation result).

Figure 8:
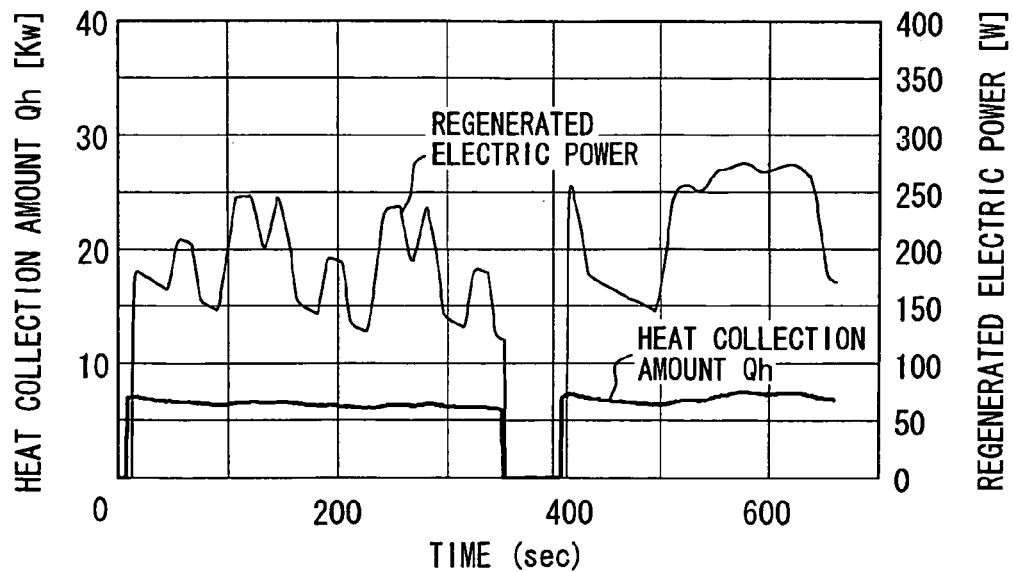
FIG. 8 is a timing chart showing a relation between a heat collection amount and a regenerated electric power according to a conventional device for utilizing the waste heat from the heat engine.

FIG. 8 is also a timing chart showing a calculated relation between the heat collection amount Qh and the regenerated electric power, wherein the heat collection amount Qh is fixed to a constant value (about 6 kW) independently from the heat radiation amount Qc at the condenser device 22 (namely, irrespectively of the outside air temperature, the vehicle speed, and/or the cooling water temperature).

As described above, in the case that the vehicle speed becomes lower, the amount of the vehicle wind supplied to the condenser device 22 and the heat radiation amount Qc at the condenser device 22 become smaller. In this case, the heat collection amount Qh is correspondingly decreased, and thereby the refrigerant pressure at the condenser device 22 is reduced, to prevent the cooling water temperature from decreasing. As a result, the regeneration efficiency of the Rankine cycle 30A is prevented from getting worse, by reducing, as shown in FIG. 7, the heat collection amount Qh in accordance with the decrease of the heat radiation amount Qc.

On the other hand, the amount of the vehicle wind and the heat radiation amount Qc become larger, as a result that the vehicle speed becomes higher. Therefore in this case, it is possible to increase the amount of the regeneration of the driving power (electric power) L of the Rankine cycle 30A, and to improve fuel efficiency of the vehicle by raising, as shown in FIG. 7, the heat collection amount Qh in accordance with the increase of the heat radiation amount Qc.

In the case that the outside air temperature is high, the temperature difference between the refrigerant in the condenser device 22 and the outside air becomes smaller and thereby the heat radiation amount Qc becomes lower. It is, however, also possible to prevent the regeneration efficiency of the Rankine cycle 30A from getting worse by reducing the heat collection amount Qh, as in the same manner to the case in which the vehicle speed is low.

In the case that the outside air temperature is low, the temperature difference between the refrigerant in the condenser device 22 and the outside air becomes larger and thereby the heat radiation amount Qc becomes higher. It is, therefore, possible to increase the amount of the regeneration of the driving power (electric power) L of the Rankine cycle 30A by raising the heat collection amount Qh.

The fuel efficiency is improved by 3.3% by the operation shown in FIG. 7, whereas the fuel efficiency is improved by 2.7% by the operation shown in FIG. 8.

In the above first embodiment, the heat collection amount Qh is determined based on the parameters of operating condition, such as the vehicle speed and the outside air temperature, wherein those parameters are also a basis for estimating the heat radiation amount Qc at the condenser device 22. However, the optimum heat collection amount Qho can be alternatively determined based on a rotational speed of the engine 10 in place of the vehicle speed.

Second Embodiment

A second embodiment of the present invention is described with reference to FIGS. 9 to 11. In the second embodiment, a method of calculating (determining) the optimum heat collection amount Qho is different from that of the first embodiment.

Figure 9:
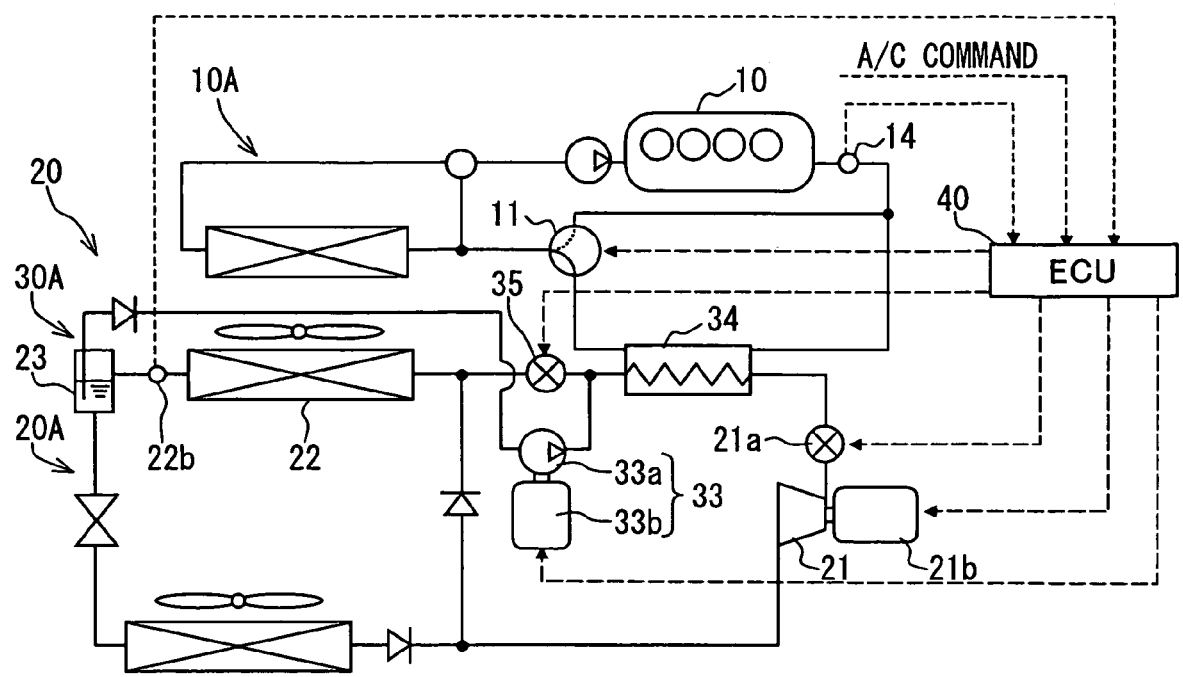
FIG. 9 is a schematic view showing a system structure of a device for utilizing the waste heat from the heat engine according to a second embodiment of the present invention.

As shown in FIG. 9, a pressure sensor 22b is provided at a gas-liquid separator side (i.e. an outlet side) of the condenser device 22, to detect a condenser side pressure Pc and to output to the controller 40 a pressure signal indicating the detected condenser side pressure Pc. The input of the outside air temperature signal and the vehicle speed signal to the controller 40 is omitted in this embodiment.

Figure 10:
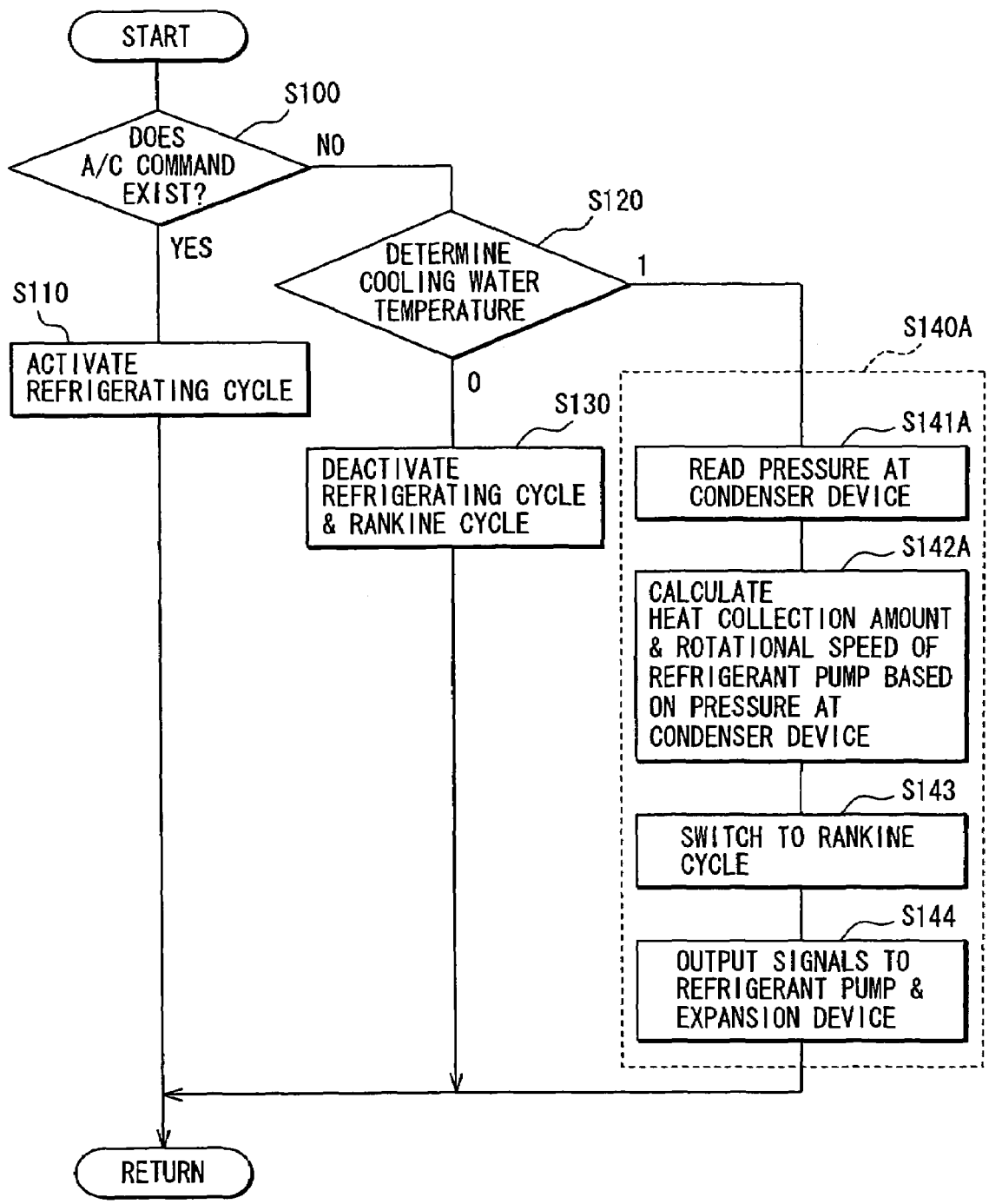
FIG. 10 is a flowchart showing a control process of an operation of a Rankine cycle according to the second embodiment.
Figure 11:
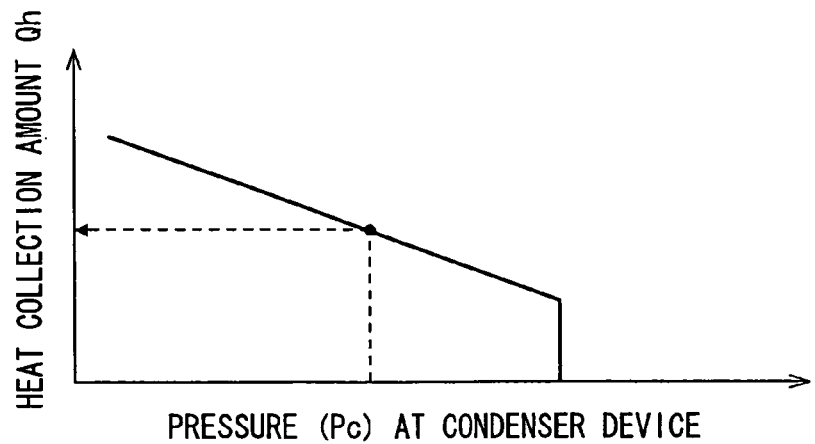
FIG. 11 is a map showing a relation between the heat collection amount and a pressure of refrigerant at a condenser device in the Rankine cycle.

In addition, as shown in FIG. 10, the step S140 for the operation of the Rankine cycle 30A is replaced with a step S140A, which is the same as the step S140 except for the steps S141 and S142 which are replaced with steps S141A and S142A.

The operation of the controller 40 is described by focusing on modifications described above. When the controller 40 determines at the step S120 that the cooling water temperature is higher than the predetermined temperature, the controller 40 reads at the step S141A the condenser side pressure Pc and determines at the step S142A the optimum heat collection amount Qho based on the condenser side pressure Pc. The optimum heat collection amount Qho is determined by means of a heat collection amount map shown in FIG. 11. In the heat collection amount map, the optimum heat collection amount Qho is correlated to the condenser side pressure Pc, which is a parameter indicating an operating condition of the condenser device 22. To be more precise, the potential maximum heat radiation amount Qco becomes larger as the condenser side pressure Pc becomes lower, and the optimum heat collection amount Qho is calculated as an optimum value in relation to the maximum heat radiation amount Qco. Subsequently, the controller 40 determines the optimum flow amount Go of the refrigerant based on the determined optimum heat collection amount Qho, and then determines the rotational speed of the refrigerant pump 33 corresponding to the determined optimum flow amount Go.

Then, the controller 40 switches the operation of the waste heat utilization device to the Rankine cycle 30A, at the step S143, and subsequently activates at the step S144 the refrigerant pump 33, to operate the Rankine cycle 30A.

Thus, it is possible to achieve similar effect with the first embodiment. In the second embodiment, since the pressure sensor 22b is used to determine the optimum heat collection amount Qho in relation to the heat radiation amount Qc, the number of the sensors is decreased compared to the first embodiment.

Third Embodiment

A third embodiment of the present invention is described with reference to FIGS. 12 and 13. The third embodiment is different from the first embodiment in that the controller 40 controls the flow amount G of the refrigerant in a different way.

Figure 12:
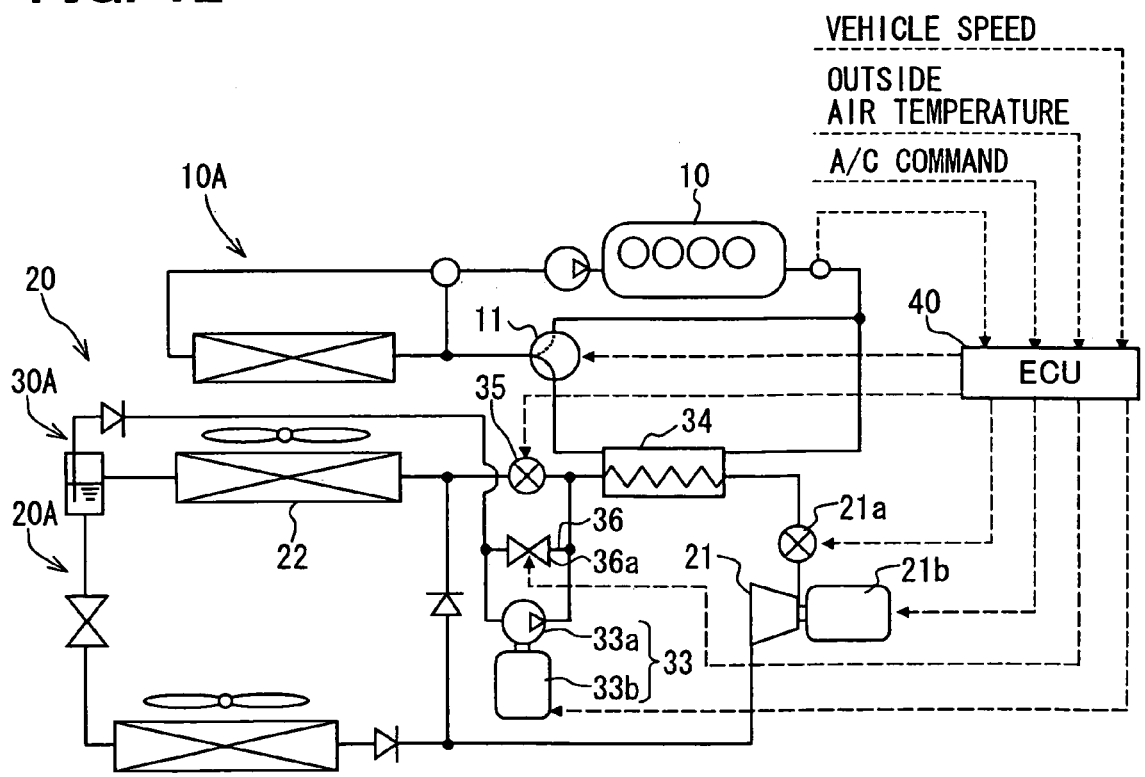
FIG. 12 is a schematic view showing a system structure of the device for utilizing waste heat from the heat engine according to a third embodiment of the present invention.

In this embodiment, as shown in FIG. 12, a bypass passage 36 bypassing the refrigerant pump 33 and a flow amount controlling valve 36a changing a cross section of the bypass passage 36 are provided. A degree of an opening of the flow amount controlling valve 36a is controlled by the controller 40.

Figure 13:
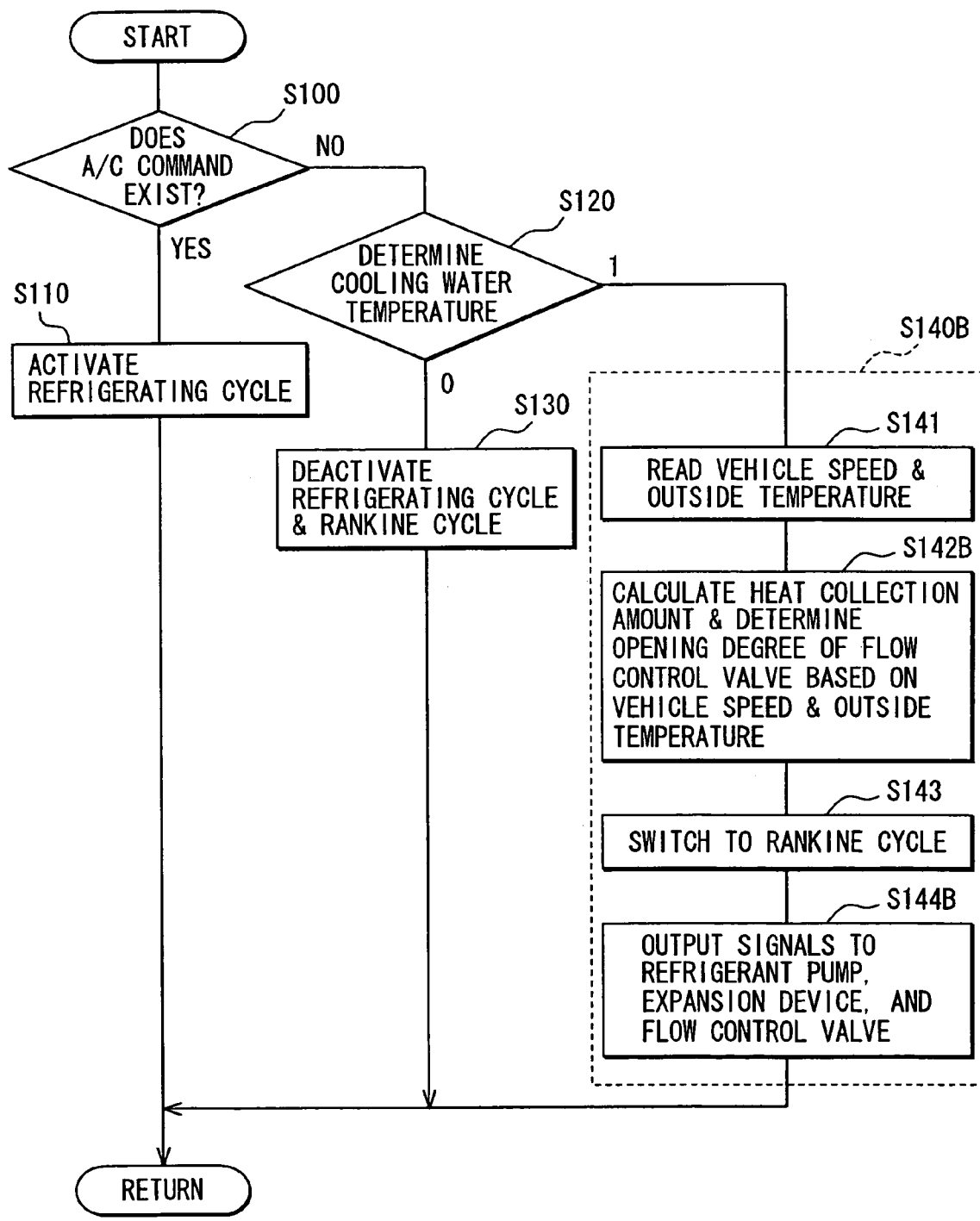
FIG. 13 is a flowchart showing a control process of an operation of a Rankine cycle according to the third embodiment.

In addition, as shown in FIG. 13, the step S140 for the operation of the Rankine cycle 30A is replaced with a step S140B, which is the same as the step S140 except for the steps S142 and S144 which are replaced with steps S142B and S144B.

The operation of the controller 40 is described by focusing on modifications described above. When the controller 40 determines at the step S120 that the cooling water temperature is higher than the predetermined temperature, the controller 40 reads at the step S141 the vehicle speed and the outside air temperature, and determines at the step S142B the optimum heat collection amount Qho and the optimum flow amount Go of the refrigerant in the same manner as the first embodiment. Further in the step S142B, the controller 40 determines the degree of the opening of the flow amount controlling valve 36a. The refrigerant pump 33 is operated at its maximum performance (i.e. maximum rotational speed). If the determined optimum flow amount Go is large, the controller 40 controls the opening degree of the flow amount controlling valve 36a at a low value, so that a large portion of the refrigerant pumped out from the refrigerant pump 33 flows into the heating device 34. On the other hand, if the determined optimum flow amount Go is small, the controller 40 controls the opening degree of the flow amount controlling valve 36a at a high value, so that the large portion of the refrigerant pumped out from the refrigerant pump 33 flows into the flow amount controlling valve 36a.

The controller 40 switches the operation of the waste heat utilization device, at the step S143, to the Rankine cycle 30A. At the step S144B, the controller 40 operates the refrigerant pump 33 at the maximum rotational speed and controls the opening degree of the flow amount controlling valve 36a at the degree determined at the step S142B, while adjusting the rotational speed of the expansion-compressor device 21.

Thus, the flow amount G of the refrigerant is controlled at the optimum flow amount Go in accordance with the opening degree of the flow amount controlling valve 36a, and a similar effect with the first embodiment is achieved.

Other Embodiment

The refrigerant pump 33 (pump portion 33a) may be a variable-amount type pump, such as a swash plate type pump or a bypass type pump, in which a pump amount for each rotation is adjustable. The flow amount of the refrigerant to the heating device 34 can be controlled by adjusting the pump amount for each rotation.

The heat engine can be an external combustion engine. In addition, the heat engine can be a stationary engine. In this case, the controller 40 may determine the optimum heat collection amount Qho based on the flow amount of the wind from the cooling fan 22a in place of the vehicle speed.

In the waste heat utilization device 20, the refrigerating cycle 20A and the Rankine cycle 30A may be separately formed. In addition, the expansion-compressor device 21 and the electric power generator-electric motor 21b may be separately formed as the expansion device and the electric power generator, respectively.

In addition, the driving power L collected at the expansion-compressor device 21 may be stored as mechanical energy such as kinetic energy of a flywheel or elastic energy of a spring.

What is claimed is:

1. A waste heat utilization device for utilizing waste heat from a heat engine mounted on a vehicle, comprising:
    a refrigerating cycle for an automotive air conditioning system, having an expansion-compressor device for compressing refrigerant, a condenser device, and an evaporator;
    a Rankine cycle including:

a heating device for heating, by means of the waste heat from the heat engine, working fluid circulated by a pump to transform the working fluid to heated vapor;

the expansion-compressor device for generating a driving power by means of expansion of the heated vapor from the heating device; and the condenser device, commonly used for the refrigerating cycle, for condensing the heated vapor from the expansion-compressor device to transform the heated vapor to condensed fluid and sending the condensed fluid to the pump; and a controller for controlling an operation of the refrigerating cycle and the Rankine cycle, wherein in a case that a temperature of the waste heat from the heat engine is higher than a predetermined temperature, and the controller determines that a demand for operating the refrigerating cycle is not existing, the controller calculates an optimum heat collection amount (Qho) which is to be collected from the heat engine, and which is correlated with a heat radiation amount (Qc) to be radiated at the condenser device in an operating condition of the waste heat utilization device at a time that such a calculation is made; and the controller controls a flow amount (G) of the working fluid to collect the heat collection amount (Oho), so that the driving power (L), which is defined by an actual heat collection amount and an actual heat radiation amount, is efficiently generated at the expansion device-compressor.

2. The device for utilizing the waste heat according to claim 1, wherein
the controller controls a rotational speed of the expansion-compressor device so that a pressure (Ph) of the working fluid at the heating device equals to a target pressure (Pho) which varies depending on the temperature of the waste heat.

3. The device for utilizing the waste heat according to claim 1, wherein
the condenser device is supplied with wind generated by a movement of the vehicle, and
the controller calculates the optimum heat collection amount (Qho) based on a vehicle speed and an outside temperature of the vehicle.

4. The device for utilizing the waste heat according to claim 1, wherein
the condenser device is supplied with wind generated by a movement of the vehicle, and
the controller calculates the optimum heat collection amount (Qho) based on a rotational speed of the heat engine and an outside temperature of the vehicle.

5. The device for utilizing the waste heat according to claim 1, wherein
the controller calculates the optimum heat collection amount (Qho) based on a pressure (Pc) of the working fluid at an outlet side of the condenser device.

6. The device for utilizing the waste heat according to claim 1, wherein
the controller changes a rotational speed of the pump to control the flow amount (G) of the working fluid.

7. The device for utilizing the waste heat according to claim 1, wherein
a pump amount of the working fluid to be pumped out from the pump for its one rotation is adjustable, and
the controller controls the flow amount (G) by adjusting the pump amount.

8. The device for utilizing the waste heat according to claim 1, further comprising:

a bypass passage bypassing the pump, a cross section of which is adjustable,
wherein the controller controls the flow amount (G) by changing the cross section.

9. A waste heat utilization device for utilizing waste heat from a heat engine mounted on a vehicle, comprising:
a refrigerating cycle for an automotive air conditioning system, having an expansion-compressor device for compressing refrigerant, a condenser device, and an evaporator; and
a Rankine cycle including:
a heating device for heating, by means of the waste heat from the heat engine, working fluid circulated by a pump to transform the working fluid to heated vapor;
the expansion-compressor device for generating a driving power (L) by means of expansion of the heated vapor from the heating device; and
the condenser device, commonly used for the refrigerating cycle, for condensing the heated vapor from the expansion-compressor device to transform the heated vapor to condensed fluid and sending the condensed fluid to the pump; and
a controller for controlling an operation of the refrigerating cycle and the Rankine cycle,
wherein in a case that a temperature of the waste heat from the heat engine is higher than a predetermined temperature, and the controller determines that a demand for operating the refrigerating cycle is not existing,
the controller calculates a flow amount (G) of the working fluid in accordance with the temperature of waste heat from the heat engine and a heat radiation amount to be radiated at the condenser device, so that the driving power (L) is efficiently generated at the expansion-compressor device.

10. A waste heat utilization device for a vehicle, comprising:
a refrigerating cycle for an automotive air conditioning system, having a compressor device for compressing refrigerant, a condenser device, and an evaporator; and
a Rankine cycle which includes;
a heating device for heating, by means of waste heat from an automotive engine, working fluid circulated by a pump to transform the working fluid to heated vapor;
an expansion device for generating a driving power (L) by means of expansion of the heated vapor from the heating device; and
the condenser device, commonly used for the refrigerating cycle, for condensing the heated vapor from the expansion device to transform the heated vapor to condensed fluid and sending the condensed fluid to the pump; and
a controller for controlling an operation of the refrigerating cycle and the Rankine cycle,
wherein the controller has a plurality of maps for respective vehicle speed, temperature of the working fluid to be supplied into the expansion device, and outside temperature of the vehicle, in which the driving power (L) and flow amount (G) of the working fluid,
the controller selects one of the maps based on detected values for the vehicle speed, temperature of the working fluid to be supplied into the expansion device, and outside temperature of the vehicle,
the controller calculates a local maximum value (Lmax) for the driving power (L) based on the map, and the controller calculates the flow amount (G) of the working fluid corresponding to the local maximum value (Lmax) for the driving power (L), in order that the controller controls the flow amount (G) of the working fluid to be circulated in the Rankine cycle, in accordance with the vehicle speed, the temperature of the working fluid to be supplied into the expansion device, and the outside temperature of the vehicle.

11. A waste heat utilization device for utilizing waste heat from a heat engine, comprising:

a Rankine cycle including:
- a heating device for heating, by means of the waste heat from the heat engine, working fluid circulated by a pump to transform the working fluid to heated vapor;
- an expansion device for generating a driving power (L) by means of expansion of the heated vapor from the heating device; and
- a condenser device for condensing the heated vapor from the expansion device to transform the heated vapor to condensed fluid and sending the condensed fluid to the pump; and a controller for controlling an operation of the Rankine cycle, wherein in a case that a temperature of the waste heat from the heat engine is higher than a predetermined temperature, the controller calculates an optimum heat collection amount (Qho) which is to be collected from the heat engine, and which is correlated with a heat radiation amount (Qc) to be radiated at the condenser device in an operating condition of the waste heat utilization device at a time that such a calculation is made; and the controller controls a flow amount (G) of the working fluid to collect the heat collection amount (Oho), so that the driving power (L), which is defined by an actual heat collection amount and an actual heat radiation amount, is efficiently generated at the expansion device, wherein, the heat engine is provided in a vehicle, the condenser device is supplied with wind generated by a movement of the vehicle, and the controller calculates the optimum heat collection amount (Qho) based on a vehicle speed and an outside temperature of the vehicle.

12. A waste heat utilization device for utilizing waste heat from a heat engine, comprising:

a Rankine cycle including:
- a heating device for heating, by means of the waste heat from the heat engine, working fluid circulated by a pump to transform the working fluid to heated vapor;
- an expansion device for generating a driving power (L) by means of expansion of the heated vapor from the heating device; and
- a condenser device for condensing the heated vapor from the expansion device to transform the heated vapor to condensed fluid and sending the condensed fluid to the pump; and a controller for controlling an operation of the Rankine cycle, wherein in a case that a temperature of the waste heat from the heat engine is higher than a predetermined temperature, the controller calculates an optimum heat collection amount (Qho) which is to be collected from the heat engine, and which is correlated with a heat radiation amount (Qc) to be radiated at the condenser device in an operating condition of the waste heat utilization device at a time that such a calculation is made; and the controller controls a flow amount (G) of the working fluid to collect the heat collection amount (Oho), so that the driving power (L), which is defined by an actual heat collection amount and an actual heat radiation amount, is efficiently generated at the expansion device, wherein, the heat engine is provided in a vehicle, the condenser device is supplied with wind generated by a movement of the vehicle, and the controller calculates the optimum heat collection amount (Qho) based on a rotational speed of the heat engine and an outside temperature of the vehicle.

13. A waste heat utilization device for utilizing waste heat from a heat engine, comprising:

a Rankine cycle including:
- a heating device for heating, by means of the waste heat from the heat engine, working fluid circulated by a pump to transform the working fluid to heated vapor;
- an expansion device for generating a driving power (L) by means of expansion of the heated vapor from the heating device; and
- a condenser device for condensing the heated vapor from the expansion device to transform the heated vapor to condensed fluid and sending the condensed fluid to the pump; and a controller for controlling an operation of the Rankine cycle, wherein in a case that a temperature of the waste heat from the heat engine is higher than a predetermined temperature, the controller calculates a local maximum value (Lmax) for the driving power (L), based on a characteristic curve of the driving power (L) with respect to flow amount (G) of the working fluid, wherein the characteristic curve has a convex at its upper side, and the controller calculates the flow amount (G) of the working fluid corresponding to the local maximum value (Lmax) for the driving power (L).

14. The waste heat utilization device according to the claim 13, wherein the controller memorizes a plurality of characteristic curves of the driving power (L) with respect to the flow amount (G) of the working fluid, wherein each of the characteristic curves corresponds to a vehicle running condition including an outside temperature and a vehicle speed.

* * * * *